United States Patent [19]

Matsunami et al.

[11] 4,286,805
[45] Sep. 1, 1981

[54] SEATBELT SYSTEM

[75] Inventors: Muneharu Matsunami, Seto; Tatsushi Kubota, Okazaki; Akio Yoshida; Nobuyuki Inokuchi, both of Toyota, all of Japan

[73] Assignees: Toyota Jidosha Kogyo Kabushiki Kaisha; Kabushiki Kaisha Tokai Rika Denki Seisakusho, both of Aichi, Japan

[21] Appl. No.: 89,444

[22] Filed: Oct. 30, 1979

[30] Foreign Application Priority Data

Oct. 31, 1978 [JP] Japan .................... 53-150088[U]

[51] Int. Cl.³ .............................................. B60R 21/10
[52] U.S. Cl. .................................................. 280/803
[58] Field of Search ............. 280/801, 802, 803, 806, 280/807, 808; 297/468, 469, 474, 475, 476, 477, 478, 479, 480, 481

[56] References Cited

U.S. PATENT DOCUMENTS

| | | | |
|---|---|---|---|
| 3,804,192 | 4/1974 | Takada | 297/478 |
| 4,087,118 | 5/1978 | Simogawa | 280/807 |
| 4,159,834 | 7/1979 | Miller et al. | 280/802 |
| 4,201,401 | 5/1980 | Brynn | 280/803 |

FOREIGN PATENT DOCUMENTS 2435767  5/1976  Fed. Rep. of Germany .......... 280/808

Primary Examiner—Joseph F. Peters, Jr.
Assistant Examiner—Randall A. Schrecengost
Attorney, Agent, or Firm—Koda and Androlia

[57] ABSTRACT

A three-point type seatbelt system wherein ends of a lap outer webbing and a shoulder webbing are secured to the upper and lower portions of a vehicle door, whereby an occupant opens or closes said door so as to automatically fasten the webbings or unfasten same from the occupant. A non-locking retractor is provided between the lap outer webbing and said door and an emergency locking retractor between the lap inner webbing and the substantially central portion of the vehicle, whereby the waist of the occupant is moved by a certain length more forward in the vehicle than his head so that his head can be prevented from dashing against a dangerous obstacle.

9 Claims, 6 Drawing Figures

SEATBELT SYSTEM

BACKGROUND OF THE INVENTION

1. Field of the Invention

This invention relates to a seatbelt system for restraining and protecting an occupant in an emergency of a vehicle such as a collision, and particularly to a seatbelt system capable of automatically fastening a restraining webbing to the occupant.

2. Description of the Prior Art

Heretofore, there have been proposed seatbelt systems for automatically fastening the seatbelt system to the occupant after he is seated so as to reliably protect the occupant in an emergency of the vehicle.

In the seatbelt system as illustrated above in FIG. 1 and described in U.S. Pat. Application Ser. No. 18,796, filed Mar. 8, 1979, one end of an inner webbing 10 is wound up by a biasing force into a retractor 12 provided at the substantially central portion of the vehicle, and a through-ring 14 is secured to the other end of the inner webbing 10. Said retractor 12 is a so-called emergency locking retractor for suddenly interrupting the wind-off rotation of the webbing only in an emergency of the vehicle.

One end of an outer webbing 16 is secured to a portion adjacent the upper end of a door 18 through a buckle device 20, the other end thereof is secured to a portion adjacent the lower end of the door 18 through an anchor device 22, and the intermediate portion thereof is turned back at said through-ring 14.

With the seatbelt system as arranged above, when the occupant opens the door 18 for entering the vehicle, the inner webbing 10 is wound off by a required length from the retractor 12 and a sufficient space for allowing the occupant to enter the vehicle is formed between the inner webbing 10 and an occupant's seat 24. Consequently, when the occupant closes the door 18 upon being seated at the seat 24, the inner webbing 10 is wound up by a wind-up force of the retractor 12, whereby the outer webbing 16 turned back at the through-ring 14 is automatically fastened to the shoulder and waist of the occupant, respectively.

Description will hereunder be given of the restraining condition of the seatbelt system with the above arrangement at the seatbelt system with the above arrangement at the time of collision of the vehicle with reference to FIGS. 2A through 2C. FIG. 2A shows the normal running condition of the vehicle. If the vehicle falls into a collision from the condition as described above, then the retractor 12 instantaneously interrupts the wind-off rotation of the webbing 10, and the occupant moves forward in parallel with the movement of the vehicle by a value of clearances between the webbing 10 and himself and between the webbing 16 and himself by an inertial force of collision as shown in FIG. 2B. Subsequently, the head of the occupant 26 moves forward in the vehicle, rotating on the waist of the occupant 26. This rotating movement is a phenomenon resulted from the fact that the outer webbing 16 moves through the through-ring 14 in the direction of the buckle device 20, i.e. the direction of the restrained shoulder of the occupant. It follows that the head of the occupant may dash against a steering wheel 28 and the like, thus causing injuries to the occupant.

SUMMARY OF THE INVENTION

The present invention contemplates to obviate the abovedescribed disadvantages, and therefore, one object of the present invention is to provide a seatbelt sysem wherein, even with an automatically fastening type seatbelt system, the occupant is prevented from dashing his head against a dangerous obstacle, thus improving the safety of the occupant.

In the seatbelt system according to the present invention, the respective ends of a lap inner webbing, a lap outer webbing and a shoulder webbing are connected to one aother and the lap outer webbing is secured to the lower portion of the door through a retractor, whereby, the lap outer webbing is prevented from moving in the direction of the shoulder webbing in an emergency of the vehicle, thereby limiting the movement of the occupant's upper body.

Description will hereunder be given of one embodiment of the present invention with reference to the drawings.

DESCRIPTION OF THE PREFERRED EMBODIMENT

Figure 1:
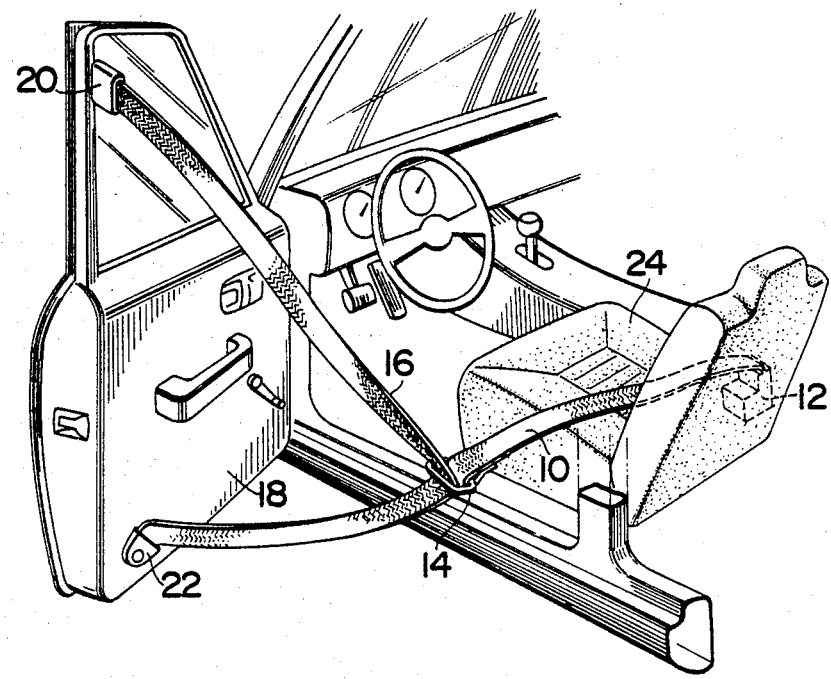
FIG. 1 is a perspective view showing an automatically fastening type seatbelt system which has heretofore been proposed.
Figure 2A:
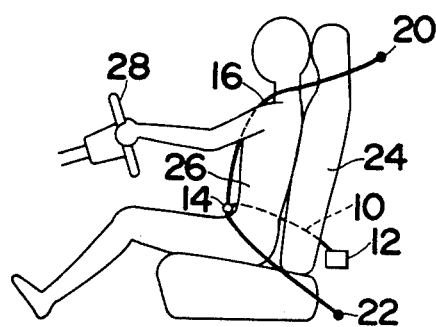
FIG. 2A through 2C are side views showing the behavior of the occupant in a collision of the vehicle of FIG. 1.
Figure 2B:
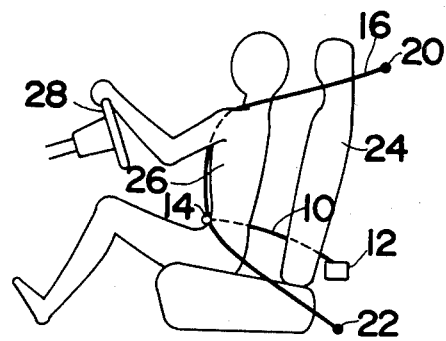
Figure 2C:
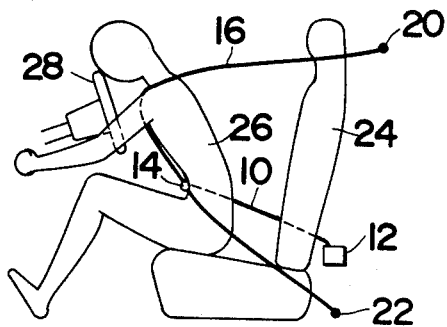
Figure 3:
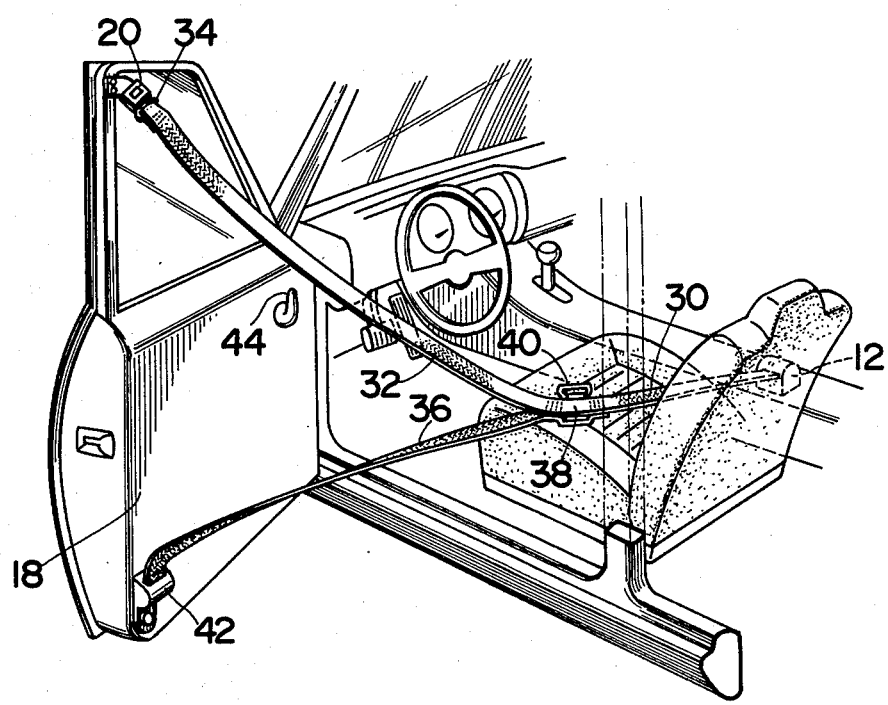
FIG. 3 is a perspective view showing one embodiment of the seatbelt system according to the present invention.

As shown in FIG. 3, one end of a lap inner webbing 30 is wound up by a biasing force into an emergency locking retractor 12 secured to the substantially central portion of the vehicle as in the prior art. Consequently, the lap inner webbing 30 is prevented from being wound off from a retractor 12 only in an emergency of the vehicle.

On the other hand, secured to one end of a shoulder webbing 32 is a tongue plate 34 which is engaged with a buckle device 20 secured to the upper portion of a door 18, whereby the shoulder webbing 32 is engaged with the door 18.

Hereupon, the lap inner webbing 30 and the other end of the shoulder webbing 32 are connected to each other, so that the lap inner webbing 30 and the shoulder webbing 32 can be integrally formed into a single seamless webbing.

Sewn onto the joint between the lap inner webbing 30 and the shoulder webbing 32 with sewing yarns 38 is one end of a lap outer webbing 36, which wraps up a ring plate 40. By said sewing, the respective end of the lap inner webbing 30, shoulder webbing 32 and lap outer webbing 36 are connected to one another.

The other end of the lap outer webbing 36 is wound up by a biasing force into a non-locking retractor 42 secured to the lower portion of the door 18. Said retractor 42 is constructed such that it can only wind up 100 to 150 mm of the lap outer webbing 36 onto its wind-up shaft by a biasing force. Said retractor 42 is not provided thereon with a special locking device for interrupting the wind-off of the webbing in course of its wind-off, and, if the lap outer webbing 36 is subjected to a tensile force in the wind-off direction, then the entire wind-up length is adapted to be wound off from the retractor 42.

Additionally, provided at the foward portion of the door 18 is a hook 44 on which a ring plate 40 can be hung.

In the present embodiment as arranged above, if the occupant opens the door 18 for entering the vehicle, then, as shown in FIG. 3, the lap inner webbing 30 and lap outer webbing 36 are wound off by required lengths from the retractors 12 and 42, respectively, against the wind-up biasing forces, so that the occupant can insert himself into a space formed between the lap inner webbing 30 and the seat 24 so as to be seated.

When the occupant closes the door 18 after he is seated, the lap inner webbing 30 and lap outer webbing 36, both of which have been wound off, are wound up into the retractors 12 and 42, respectively, whereby the ring plate 40 approaches the retractor 12. Consequently, the shoulder webbing 32 and lap outer webbing 36 can be automatically fastened to the occupant.

In the normal running condition of the vehicle, the webbings 30 and 36 can be wound off from the retractors 12 and 42, respectively, so that the occupant can freely change his driving posture.

In the normal running condition of the vehicle, if the occupant moves in the rearward or forward direction from the position, at which he has been positioned, due to the reason of changing the driving posture or the like then the retractor 12 winds off or up the lap inner webbing 30 some length corresponding to the rearward or forward movement, so that the shoulder webbing 32 and lap inner webbing 30 can always be closely attached to the occupant. At this time, the lap outer webbing 36 is also wound off from or wound up into the retractor 12, following the lap inner webbing 30. However, the retractor 12 is designed such that, after the shoulder webbing 32 is closely attached to the shoulder of the occupant, the retractor 12 does not wind up the lap inner webbing 30 any more, so that the retractor 12 cannot wind off the lap outer webbing 36 from the retractor 42 beyond necessity, thereby enabling to constantly closely attach the lap outer webbing 36 to the occupant.

Description will hereunder be given of operation in an emergency of the vehicle such as a collision. Upon sensing the acceleration of the vehicle, the emergency locking retractor 12 instantaneously interrupts the wind-off of the lap inner webbing 30. While, the non-locking retractor 42 is not provided thereon with a locking device for locking the webbing in course of the wind-off of the webbing, whereby said non-locking retractor 42 winds off the entire wind-off length of the lap outer webbing 36 until it stops.

Figure 4:
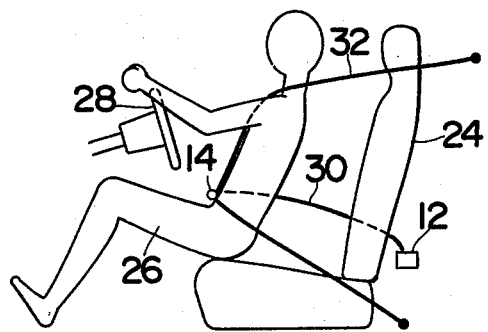
FIG. 4 is a side view showing the behavior of the occupant in a collision.

It follows that, as shown in FIG. 4, the waist of the occupant 26 can move forward in the vehicle by the wind-up length of the non-locking retractor 42, whereby so called submarine phenomenon slightly occurs in which the waist of the occupant moves more forward in the vehicle than his head to a certain extent. In the case said submarine phenomenon occurs to a great extent, the restraining of the occupant becomes imperfect, which is undesirable. However, a slight occurrence of said submarine phenomenon gives little danger to the occupant.

As described above, the head of the occupant 26 is disposed more rearward in the vehicle than the waist and the lap inner webbing 30 does not move in the direction of the shoulder webbing 32 as in the prior art, whereby the head of the occupant 26 does not dash against any dangerous obstacle in the cabin, thus protecting the occupant safe.

In the case the occupant wants to leave the vehicle after completion of normal running of the vehicle, if the occupant opens the door 18, then the webbings permits the occupant to leave the vehicle again as shown in FIG. 3. If the occupant hangs the ring plate 40 onto the hook 44 when leaving the vehicle, he can more easily leave the vehicle and more easily enter the vehicle again. If said hook 44 is constructed such that it is reversed downwardly as the door is closed, then the webbings can be automatically fastened to the occupant only when the occupant closes the door after he is seated.

In addition, in the above embodiment, description has been given of the seatbelt wherein one end of the lap outer webbing 36 is engaged with the door 18 through the non-locking retractor 42. However, one end of the lap outer webbing 36 may be engaged with the door 18 through the emergency locking retractor 12 like the lap inner webbing 30.

As has been described so far, in the seatbelt system according to the present invention, the lap outer webbing is not movable in the direction of the shoulder webbing and the lap outer webbing is secured to the door through the retractor. Hence, said seatbelt system offers such an excellent advantage that the possibility of the occupant dashing his head against any dangerous obstacle is reduced, so that the safety of the occupant can be further improved.

What is claimed is:

1. A seatbelt system comprising:
   (a) a first retractor secured to the substantially central portion of the vehicle for winding up one end of a lap inner webbing;
   (b) a second retractor secured to the lower portion of a vehicle door for winding up one end of a lap outer webbing, the other end of which is secured to the forward end of said lap inner webbing; and
   (c) an engageable member for securing to the upper portion of the vehicle door one end of a shoulder webbing, the other end of which is secured to the forward ends of said lap inner webbing and lap outer webbing; whereby the webbings are attached to or separated from a seated occupant by opening or closing the vehicle door, thereby automatically fastening the webbings to or unfastening same from the occupant.

2. A seatbelt system as set forth in claim 1, wherein said first retractor is an emergency locking retractor in which the lap inner webbing is wound up by a biasing force, and, in an emergency of the vehicle, the webbings are prevented from being wound off.

3. A seatbelt system as set forth in claim 2, wherein said second retractor is a non-locking retractor in which the lap outer webbing is wound up by a biasing force, and the entire wind-up length of the lap outer webbing can be wound off by tensile force of said webbing.

4. A seatbelt system as set forth in claim 3, wherein the webbing wind-up length by said second retractor is 100 to 150 mm.

5. A seatbelt system as set forth in claim 3, wherein said engageable member comprises a buckle device solidly secured to the vehicle door and a tongue plate secured to said end of the shoulder webbing and engageable with said buckle device.

6. A seatbelt system as set forth in claim 3, wherein said lap inner webbing and shoulder webbing are connected to each other and formed into a single webbing.

7. A seatbelt system as set forth in claim 3, wherein a ring plate is provided at the joint of said three webbings and said ring plate can be hung on a hook provided on the vehicle door.

8. A seatbelt system as set forth in claim 7, wherein said ring plate is wrapped up by the joint of the three webbings.

9. A seatbelt system, wherein ends of a lap outer webbing and shoulder webbing are engaged with the upper and lower portion of a vehicle door, respectively, and the vehicle door is closed so as to automatically fasten the webbings to the occupant, comprising:

(a) a non-locking retractor provided at the lower portion of the vehicle door for winding up one end of the lap outer webbing;
(b) a tongue plate secured to said end of the shoulder webbing;
(c) a buckle device secured to the upper portion of the vehicle door for being engaged with said tongue plate;
(d) a lap inner webbing, one end of which is engaged with the other ends of said lap outer webbing and shoulder webbing; and
(e) an emergency locking retractor provided at the substantially central portion of the vehicle for winding up the other end of said lap inner webbing by a biasing force, and, in an emergency of the vehicle, said webbing is prevented from being wound off; whereby, in an emergency of the vehicle, the waist of the occupant is moved by a certain length more forward in the vehicle than his head so that his head can be prevented from dashing against a dangerous obstacle.

* * * * *

UNITED STATES PATENT AND TRADEMARK OFFICE
CERTIFICATE OF CORRECTION

PATENT NO. : 4,286,805

DATED : September 1, 1981

INVENTOR(S) : Muneharu Matsunami, et al

It is certified that error appears in the above—identified patent and that said Letters Patent is hereby corrected as shown below:

ON THE TITLE PAGE
   At [75] Inventors: add --Yoshihiro Hayashi, Kasugai,--.

Signed and Sealed this

Twenty-fourth Day of November 1981

[SEAL]

Attest:

GERALD J. MOSSINGHOFF

Attesting Officer        Commissioner of Patents and Trademarks